United States Patent [19]

Stephenson

[11] Patent Number: 4,938,073
[45] Date of Patent: Jul. 3, 1990

[54] EXPANDED RANGE MAGNETIC FLOW METER

[75] Inventor: Stanley V. Stephenson, Duncan, Okla.

[73] Assignee: Halliburton Company, Duncan, Okla.

[21] Appl. No.: 243,950

[22] Filed: Sep. 13, 1988

[51] Int. Cl.⁵ .............................................. G01F 1/58
[52] U.S. Cl. ..................................................... 73/861.12
[58] Field of Search ........... 73/861.12, 861.13, 861.14, 73/861.15

[56] References Cited

U.S. PATENT DOCUMENTS

| | | |
|---|---|---|
| 2,696,737 | 12/1954 | Mittelmann . |
| 3,219,851 | 11/1965 | Kidwell . |
| 3,323,364 | 6/1967 | Hunter . |
| 3,406,569 | 10/1968 | Rohmann ........................ 73/861.12 |
| 3,745,824 | 7/1973 | Mannherz ........................ 73/861.12 |
| 3,926,049 | 12/1975 | Seabode et al. . |
| 4,117,720 | 10/1978 | Simonsen et al. ................ 73/861.12 |
| 4,524,627 | 6/1985 | Yamasaki et al. ................ 73/861.12 |

FOREIGN PATENT DOCUMENTS 1014754 12/1965 United Kingdom .

OTHER PUBLICATIONS

Hindes, Charles S., "Development of an Electromagnetic Water Current Velocity Meter", Oceanology International, vol. 72, pp. 44–50.

*Primary Examiner*—Charles A. Ruehl
*Attorney, Agent, or Firm*—James R. Duzan; Joseph A. Walkowski; Mark E. McBurney

[57] ABSTRACT

An expanded range magnetic flowmeter is provided and includes an insertion device which can vary the velocity of a conductive fluid flowing therethrough. The insert expands the range of the flowmeter by maintaining a minimum fluid velocity through a flow tube. The flow tube includes diametrically opposed electrodes disposed therein which are connected to a voltage measuring device. A magnetic field is placed at a 90° angle to the flow of the conductive fluid such that a voltage is generated and measured as the conductive fluid flows through the tube.

19 Claims, 2 Drawing Sheets

EXPANDED RANGE MAGNETIC FLOW METER

BACKGROUND OF THE INVENTION

Magnetic flowmeters powered by alternating current power supplies are well known. Such meters operate by measuring the voltage produced by a conductive fluid passing through a fixed diameter tube placed in an electrically generated magnetic field. The voltage produced is a linear function of volumetric flow rate through a fixed diameter tube according to Faraday's law of electromagnetic induction. These meters are extensively used in laboratory situations and mobile applications, such as when a meter mounted on a vehicle is taken to the site of a petroleum well and employed to measure additives used in a treating fluid for the well. In a laboratory setting, these flowmeters are used to measure and develop the well treatment additives. An example of such a flowmeter is the 1800 Series Magnetic Flowtube Lined Metal Metering Tube, produced by the Foxboro Company, Foxboro, Mass. Another such meter is described in U.S. Pat. No. 2,696,737 to E. Mittelman where the voltage induced as the fluid flows through a magnetic field is maximized. This allows for enhanced reading of the actual developed voltage and helps prevent the pickup of stray noise. Other relevant U.S. Patents are Kidwell (3,219,851), Hunter (3,323,364) and Seebode et al (3,926,049). Additionally, United Kingdom Patent specification No. 1,014,754 and an article entitled "Development of an Electromagnetic Water Current Velocity Meter" by Charles S. Hindes describe flowmeters which operate when a fluid flows through a magnetic field and induces a voltage proportional to the velocity of the fluid.

None of the aforementioned prior art discusses or addresses the problem solved by the present invention, which is specifically, expanding the range of fluid flow volumes over which a magnetic flowmeter can reliably and accurately operate. The limiting factor of a magnetic flowmeter range is the minimum flow velocity required to maintain an acceptable signal level. Prior to the present invention, a complete, separate flowmeter must be used for each of various fluid flow ranges. Therefore, in a laboratory setting where a flowmeter may be used for many different applications, the present invention eliminates the need to have different sized meters to run various tests at different volumetric flow rates. A typical magnetic flow meter may cost as much as $3,500.00, and ten such meters having varying flow ranges are often required. The present invention can substantially decrease laboratory costs by allowing a single flowmeter to operate over the same range of fluid flow velocity at many different volumetric flow rates, in contrast to the prior art, wherein several flowmeters were required.

SUMMARY OF THE INVENTION

Broadly, the present invention provides an apparatus which can be inserted into a flowmeter tube to decrease the inside diameter thereof. The decreased flowmeter tube area (bore) will cause the fluid to have an increased velocity for a constant pressure or volumetric flow rate.

The inserts of the present invention include electrodes which are in alignment with electrodes on the inside surface of the flowmeter tube, in order to maintain a conductive path between the flowmeter electrodes and the new, decreased bore resulting from use of an insert.

In accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
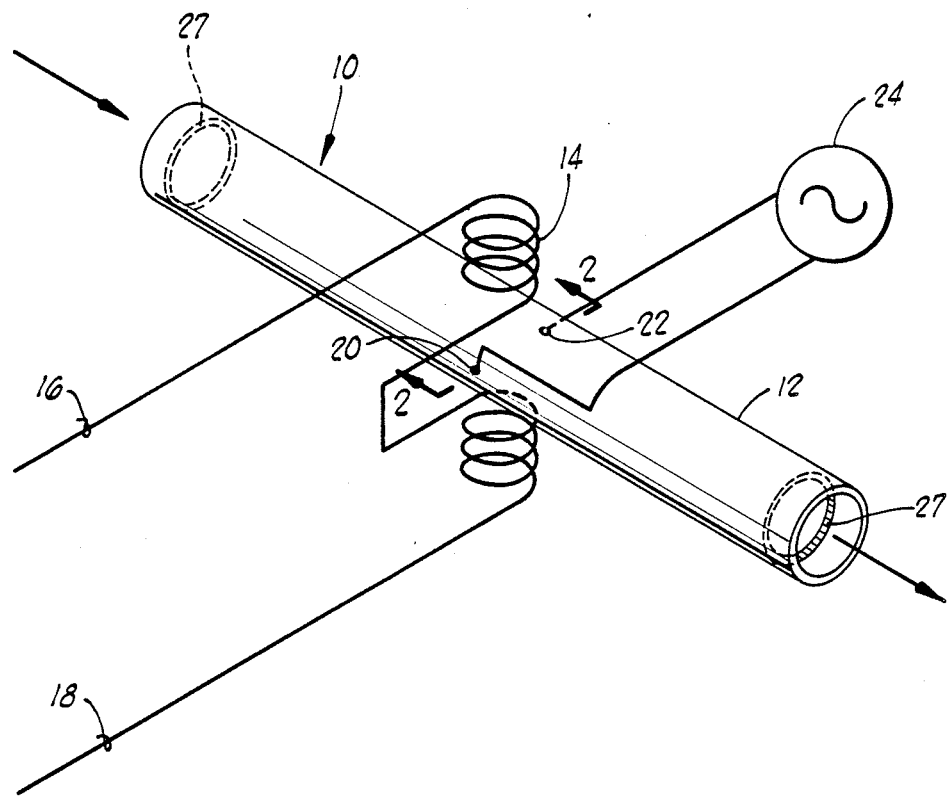
FIG. 1 is a perspective view which schematically illustrates magnetic flowmeters for use in conjunction with the present invention.

Referring now to the drawings, in particular FIG. 1, the method and apparatus of the present invention will be described hereafter in detail.

Magnetic flowmeter 10 is schematically depicted as comprising a constant diameter tube 12 made of or lined with a non-conductive substance, oriented in a magnetic field generated by an electrically powered inductor 14. The electrical power supply leads 16 and 18 of an alternating current power supply (not shown) lead to the inductor 14. As a conductive fluid flows in tube 12 (as shown by arrows on FIG. 1) through the magnetic field generated by inductor 14 a low level electrical voltage is generated according to Faraday's law of electromagnetic induction, which states that an induced voltage occurs when a conductor (in this instance the conductive fluid) passes through a magnetic field at right angles to that field. Furthermore, the induced voltage is proportional to the intensity of the magnetic field, multiplied by the width and velocity of the conductor.

The induced low level voltage is sensed by sensing electrodes 20, 22 placed in diametrically opposite positions in the wall of flow tube 12. This voltage is amplified and conditioned by means well known in the art to produce an output signal which can be measured with a commercially available means 24, such as an ammeter, volt meter or frequency meter depending on the type output for which the low level signal is conditioned. The low level voltage produced is proportional to the velocity of the conductive fluid, being a function of its volumetric flow rate through the constant diameter tube 12.

Figure 2:
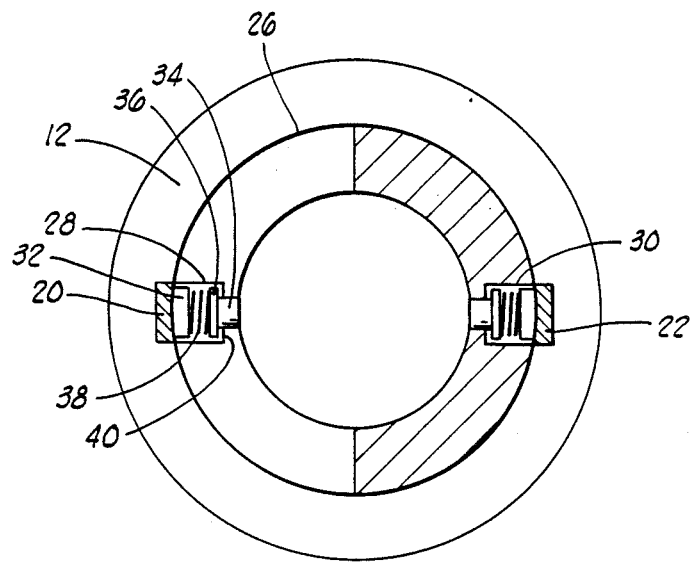
FIG. 2 is a cross sectional view, taken along line 2—2 of FIG. 1, showing the flowmeter tube with an insert disposed therein and electrode of the present invention.

Next, FIG. 2 shows a cross sectional view of the flow tube 12 taken along line 2—2 of FIG. 1. A reduced bore insert 26 of the present invention is shown inserted into flow tube 12. The reduced inside area (bore) of insert 26 acts to increase the velocity of fluid flowing through flowmeter 10 thereby maintaining an acceptable accuracy level at volumetric flow rates much lower than could be achieved with the unrestricted bore of flow tube 12. Inserts 26 may be made of or lined or covered with any suitable non-conductive material, such as polytetraflouroethylene (Teflon), polyurethane, buna-N rubber, neoprene, or fiberglass, the foregoing intended to be by way of example and not limitation. Insert 26 should be of only slightly smaller outer diameter than the inner diameter of flow tube 12. Furthermore, it has been determined through past testing and research that the length of insert 26 must be at least equal to the inside diameter of tube 12, however a length of at least two diameters is preferred. This insert length of non-conductive or insulative material will prevent the electric voltage generated as a result of material flow through the insert from being distorted due to the pressure of any electrically grounded points which may be connected to magnetic flowmeter 10.

It is possible to dispose an o-ring seal 27 between the outer diameter of insert 26 and the inner diameter of flow tube 12 to prevent fluid from bypassing the insert bore and giving erroneous readings by shorting out insert electrode contacts 28 and 30, the structure of which will be hereinafter described.

It should be noted that although only a single insert 26 is shown, a plurality of interchangeable inserts 26 could be utilized to provide further fluid flow velocity increments. For example, several inserts 26 having constant outside diameters (equal to the inside diameter of tube 12) and varying inside diameters could be provided to further expand the range of flowmeter 10. Additionally, inserts 26 could be sized so as to fit one inside the other. That is, each successively smaller insert 26 would have an outside diameter substantially corresponding to the inside diameter of the next larger insert 26. Of course, contacts 28 and 30 would always be diametrically opposed each other so that an electrically conductive path is maintained from the fluid within the innermost insert 26, through each successively larger insert 26 and to electrodes 20 and 22.

Electrode contacts 28 and 30 are disposed within insert 26 and positioned diametrically opposite of one another such that electrical connection with electrodes 20 and 22 of flowmeter 10 can be achieved.

Contact 28 will now be described; however, it should be understood that contact 30 is identical in structure and operation thereto. A conductive surface or pad 32 is provided which electrically contacts flow tube electrode 20. An insert electrode 34 is provided which extends inwardly from insert 26 such that electrical contact with the conductive fluid flowing therethrough is achieved. Biasing plate 36 is disposed on the inside of electrode 34 and in contact with biasing means 38. Plate 36 allows surface 34 to extend into the fluid flow within insert 26 up to the point where contact with shoulder 40 occurs.

Electrically conductive biasing means 38, such as a coiled spring or the like, is disposed between surface or pad 32 and plate 36, the energy in biasing means 38 pushing surface or pad 32 against flow tube electrode 20 such that an electrically conductive path extends from the fluid to flow tube electrode 20. The components of contact 28 which allow this electrical path to be effected include, fluid contact electrode 34, plate 36, biasing means 38 and surface 32, which abuts electrode 20. Thus, it can be seen that contact 28 is a means for providing an electrically conductive path from the fluid within insert 26 to flowmeter electrode 20 which is disposed in flow tube 12. Insert contacts 28 and 30 are described by way of example but are not intended as a limitation. For example, a set screw may be used to provide an electrically conductive path between the fluid and electrodes 20, 22 and further to affix insert 26 within tube 12.

Figure 3:
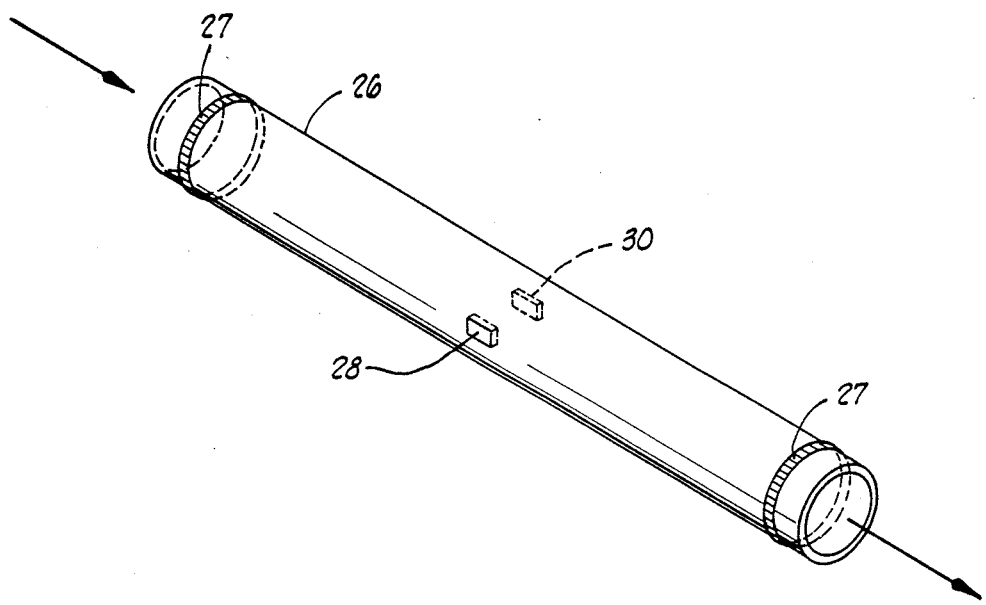
FIG. 3 is a perspective view showing the flowmeter tube insert of the present invention, which is received by the tube of the magnetic flowmeter.

Referring to FIG. 3, a perspective of insert 26 is shown prior to insertion into flowmeter tube 12. Electrode contacts 28 and 30 are shown schematically and the fluid flow through insert 26 is indicated by the arrows.

Next, the operation of the expanded range magnetic flowmeter of the present invention will be described. As previously noted, the insert 26 is received within magnetic flowmeter tube 12 such that the velocity of the fluid flowing therethrough is maintained. Thus it can readily be seen that the present invention allows an expanded range of volumetric flow rates to be measured from a single flowmeter.

For example, a typical flowmeter is accurate over any 10:1 calibrated range within a 100:1 operating range. Thus, a flowmeter with a four inch diameter tube will operate in a range of from 14 to 1400 gpm. If various inserts 26 were placed within tube 12 such that (with the smallest bore insert) a 0.10 inch diameter bore tube is provided, then the total range of this flowmeter would be from 0.008 gpm, for the 0.10 inch bore, to 1400 gpm, for the four inch bore, i.e. with the insert 26 removed. This equates to an effective range of 175,000:1 with a single flowmeter by changing inserts and recalibrating the measurement means 24 for each insert, flow tube combination.

Therefore, it will be readily apparent to one skilled in the art that a single magnetic flowmeter used in conjunction with several inserts 26 of the present invention, will provide a range of fluid volumetric flow rates which was previously only obtainable by having several flowmeters of different flow tube diameters. Due to the relatively expensive cost of magnetic flowmeters, and the relatively inexpensive cost of inserts 12, a substantial savings can be realized without restricting the range limitations of a single magnetic flowmeter.

The inserts of the present invention may be maintained within flow tubes by various means. For example, as noted above, set screws may be employed. Similarly, snap rings disposed within grooves on the interior of the flowmeter tube and extending diametrically inward of the outer diameter of the insert are also suitable. In addition, flanged connections having inner diameters less than that of the flowmeter tube may also be employed at each end of the flowmeter to maintain an insert in place against fluid flow forces.

Although certain preferred embodiments have been shown and described, it should be understood that many changes and modifications may be made therein without departing from the scope of the appended claims.

What is claimed is:

1. An expanded range magnetic flowmeter, comprising:
   a flow tube of a substantially fixed inner diameter;
   an electrically powered inductance proximate said flow tube;
   means for measuring voltage generated by flow of a conductive fluid through said flow tube and through a magnetic field generated by said inductance;
   insertion means for being interchangeably inserted into said flow tube to permit different said insertion means to be used with said flow tube, wherein a selected inserted insertion means provides means for maintaining a predetermined velocity of said conductive fluid through said flow tube; and
   seal means, extending about and between an outer periphery of said insertion means and an inner periphery of said flow tube, for providing a sealing engagement between said flow tube and said insertion means such that said conductive fluid is prevented from entering therebetween.

2. An expanded range magnetic flowmeter according to claim 1, wherein said flow tube comprises electrode means for providing an electrically conductive path from said measuring means to said insertion means.

3. An expanded range magnetic flowmeter according to claim 1 wherein said insertion means is substantially cylindrically configured and constructed of an electrically insulative material.

4. An expanded range magnetic flowmeter comprising:
   a flow tube of a substantially fixed inner diameter;
   an electrically powered inductance proximate said flow tube;
   means for measuring voltage generated by flow of a conductive fluid through said flow tube and through a magnetic field generated by said inductance;
   insertion means for maintaining a predetermined velocity of said conductive fluid through said flow tube;
   seal means for providing a sealing engagement between said flow tube and said insertion means such that said conductive fluid is prevented from entering therebetween;
   wherein said flow tube comprises electrode means for providing an electrically conductive path from said measuring means to said insertion means; and
   wherein said insertion means includes electrode contact means for providing an electrically conductive path between said conductive fluid and said electrode means.

5. A method of expanding the range of volumetric flow rates of a conductive fluid, over which a magnetic flowmeter, including measuring means, an inductor and a flow tube having electrodes disposed therein, can accurately operate, said method comprising the steps of:
   (a) providing electrically insulative insertion means, including electrode contacts disposed therein, said insertion means for maintaining a predetermined velocity of said conductive fluid through said flow tube;
   (b) inserting said insertion means into said flow tube;
   (c) aligning said electrode contacts with said electrodes such that abutment is achieved therebetween; and
   (d) measuring the flow rate of said conductive fluid through said flow tube.

6. A method according to claim 5 wherein the step of inserting said insertion means comprises the step of
   providing a fluid tight seal between said insertion means and said flow tube.

7. An insert for a magnetic flowmeter, said magnetic flowmeter including a fixed diameter flow tube, electrodes, magnetic source and measuring device, for measuring a flow rate of an electrically conductive fluid, said insert comprising:
   a tubular housing capable of being disposed within said fixed diameter flow tube and having an inside diameter less than said flow tube inside diameter;
   electrode contacts disposed on said tubular housing diametrically opposite each other, said contacts for maintaining an electrically conductive path from said conductive fluid to said measuring device; and
   seal means for providing sealing engagement between said flow tube and said tubular housing such that said electrically conductive fluid is prevented from entering an annular area defined therebetween.

8. An insert according to claim 7 wherein the outside diameter of said tubular housing substantially corresponds to the inside diameter of said fixed diameter flow tube.

9. An insert according to claim 8 wherein said electrode contacts are aligned, and in electrical communication with said magnetic flowmeter electrodes.

10. An insert according to claim 8 wherein said electrode contacts include:
    a first conductive surface which electrically contacts said magnetic flowmeter electrode;
    a second conductive surface for electrically contacting said conductive fluid;
    a plate disposed on said second conductive surface on a side opposite said conductive fluid; and
    biasing means, disposed between said first conductive surface and said plate, for biasing said first conductive surface towards said magnetic flowmeter electrode, and for biasing said second conductive surface towards said conductive fluid, such that electrical contact is maintained therebetween.

11. An insert according to claim 10 wherein said biasing means includes a helical spring.

12. An insert according to claim 10 wherein said biasing means is constructed from a electrically conductive material and forms a portion of said electrically conductive path.

13. An insert according to claim 7 wherein said tubular housing is constructed from an electrically insulative material.

14. An insert according to claim 7 wherein said electrode contacts are constructed from an electrically conductive material.

15. An insert according to claim 7 wherein the length of said tubular housing is in the range of one to two times the diameter of said fixed diameter flow tube.

16. A method of expanding the range of volumetric flow rates of a conductive fluid, over which a magnetic flowmeter including measuring means, an inductor and a flow tube having electrodes disposed therein, can accurately operate, said method comprising the steps of:
    (a) providing electrically insulative insertion means, including electrode contacts disposed therein, said insertion means for maintaining a predetermined velocity of said conductive fluid through said flow tube;
    (b) inserting said insertion means into said flow tube;
    (c) aligning said electrode contacts with said electrodes;
    (d) maintaining the relative position of said insertion means within said flow tube;
    (e) providing a fluid tight seal between said insertion means and said flow tube; and
    (f) measuring the flow rate of said conductive fluid through said flow tube.

17. An insert for a magnetic flowmeter, said magnetic flowmeter including a fixed diameter flow tube, electrodes, magnetic source and measuring device which measures a flow rate of an electrically conductive fluid, said insert comprising:
    a tubular housing capable of being disposed within said fixed diameter flow tube and having an inside diameter less than said flow tube inside diameter, said tubular housing having an outside diameter substantially corresponding to the inside diameter of said fixed diameter flow tube;

electrode contacts, disposed diametrically opposite each other within said tubular housing, for maintaining an electrically conductive path from said conductive fluid to said measuring device, said electrode contacts including:
- a first conductive surface which electrically contacts said magnetic flowmeter electrode;
- a second conductive surface for electrically contracting said conductive fluid;
- a plate disposed on said second conductive surface on a side opposite said conductive fluid; and
- biasing means, disposed between said first conductive surface and said plate, for biasing said first conductive surface towards said magnetic flowmeter electrode, and for biasing said second conductive surface towards said conductive fluid, such that electrical contact is maintained therebetween.

18. An insert according to claim 17 wherein said biasing means is constructed from an electrically conductive material and forms a portion of said electrically conductive path.

19. An insert according to claim 17 wherein said biasing means includes a helical spring.

* * * * *